US006940935B2

(12) United States Patent
Lee et al.

(10) Patent No.: US 6,940,935 B2
(45) Date of Patent: Sep. 6, 2005

(54) SYSTEM AND METHOD FOR ALIGNING DATA BETWEEN LOCAL AND REMOTE SOURCES THEREOF

(75) Inventors: Tony J. Lee, Pullman, WA (US); Jeffrey L. Hawbaker, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1069 days.

(21) Appl. No.: 09/827,513

(22) Filed: Apr. 5, 2001

(65) Prior Publication Data

US 2002/0146083 A1 Oct. 10, 2002

(51) Int. Cl.[7] .......................... H04L 29/12; H04L 29/00

(52) U.S. Cl. ....................................................... 375/355

(58) Field of Search ................................ 375/355, 365, 375/377, 244; 370/276, 277, 282, 284, 342, 344, 347, 350

(56) References Cited

U.S. PATENT DOCUMENTS 6,256,592 B1 * 7/2001 Roberts et al. ............... 702/59
6,650,874 B1 * 11/2003 Banik et al. .................. 455/71

* cited by examiner

*Primary Examiner*—Mohammed Ghayour
*Assistant Examiner*—Dung X. Nguyen
(74) *Attorney, Agent, or Firm*—Cook, Alex, McFarron, Manzo, Cummings & Mehler, Ltd.

(57) ABSTRACT

Local source data is first sampled at an original sampling rate and then resampled at a first resampling rate which is equal to the framing rate for transmitting said data to the remote source. The resampled local source data is then delayed by the transmission time between the local and remote data sources. The data from the remote relay which is resampled at the remote source at the first resampling rate and the delayed resampled data at the local source are both then resampled at a second resampling rate, at an original sampling rate, to produce aligned data at the local source.

19 Claims, 2 Drawing Sheets

SYSTEM AND METHOD FOR ALIGNING DATA BETWEEN LOCAL AND REMOTE SOURCES THEREOF

TECHNICAL FIELD

This invention relates generally to the transmission of data between two sources thereof and the comparison of such transmitted data, and more specifically concerns a data transmission system having the capability of aligning the data from two sources prior to comparison thereof.

BACKGROUND OF THE INVENTION

Comparison of data from two remote sources is done for various reasons; preferably, the data sets are aligned, so that accurate comparison is possible. This is true regardless of whether the data is transmitted synchronously or asynchronously.

One example of a system using data comparison is a differential relay which is used for protection of an electric power system. The relay in operation compares the electrical current values on the power line at a local source of electric current values (referred to as the local relay) and a remote source of current values on the same line (referred to as the remote relay). If the current differential comparisons performed by the relay are to be accurate, initial alignment of the two sets of data (from the local and remote sources) before the comparisons are made is important.

Other applications where alignment of data is important are well known. These include, among others, event recorder systems and breaker failure systems in power protection applications and metering systems, which are broader than power protection, as well as other situations where alignment of data between local and remote sources is important, typically for comparison purposes.

Basically, the alignment problem with two sets of data occurs because of differences in the sampling of the two data sets, one local data set and one remote. The sampling for instance could be different in phase, or the sampling frequency could be different between the two data sets. These differences result in an unknown and changing phase shift between the two data sets. Further, the sampled data from the remote source, when transmitted to the local source for comparison, arrives with a time differential relative to the sampled data at the local source, due to the unknown transmission time (delay) between the two data sources.

DISCLOSURE OF THE INVENTION

Accordingly, the present invention is a system for aligning and synchronizing data between local and remote sources of data, comprising: a first sampling system for initially sampling local source data at an original sampling rate; a receiver at the local source for receiving sampled data from a remote source; a transmitter for transmitting the sampled data from the local source to the remote source; a delay element for delaying the sampled data from the local source by an amount of time approximately equal to the data transmission delay time between the local and remote sources; and a resampling system for resampling the delayed local source data and the received data from the remote source at a selected resampling rate, wherein the resulting output of the resampling system is such that the remote data is aligned with the local data at the local source.

BEST MODE FOR CARRYING OUT THE INVENTION

Figure 1:
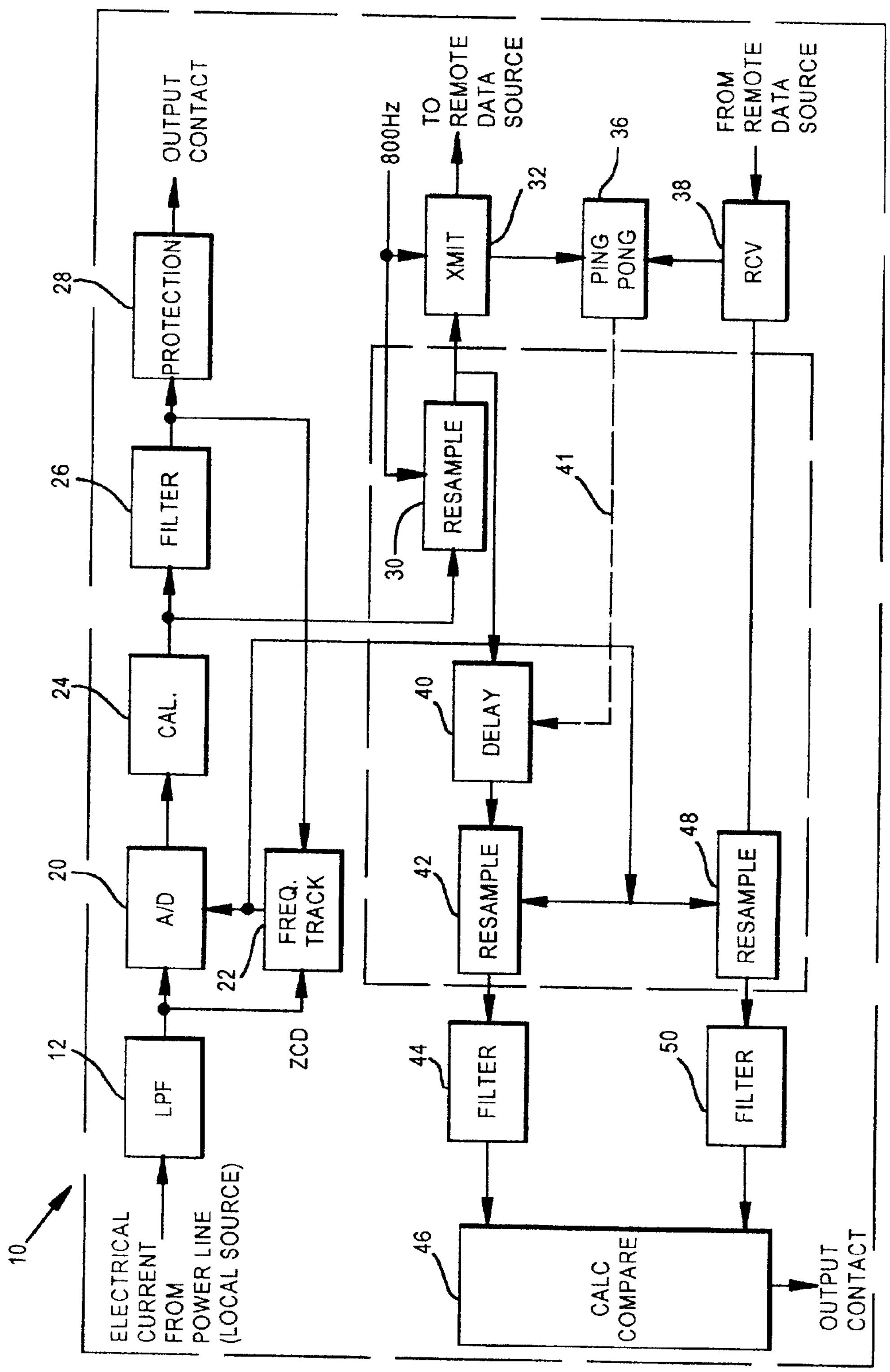
FIG. 1 is a block diagram showing the system of the present invention with a local source of data and a remote source of data, with both data sets being electrical current values from a power line.

FIG. 1 is a block diagram showing the basic system of the present invention for the application of a differential current relay used for protection of an electric power line. However, it should be understood that such an application of the present invention is for illustration purposes only and is not intended to limit the scope of the invention.

In FIG. 1, the analog electrical current signal from a power line (the signal level being decreased by a current transformer) at a given point on the power line which is the location of the local relay referred to at 10 is applied to a low pass filter portion 12 of the relay. The location is a specific physical point on the power line. A similar data source/relay to that shown at 10 is located remotely from the local data source on the same power line.

Referring still to FIG. 1, the local data set (e.g. electric current signals from the power line at the local relay), initially filtered by low pass filter 12 and then applied to an analog-to-digital (A–D) converter 20. The A–D converter 20 is driven by a frequency tracker 22 to sample the analog current signal 16 times (in the embodiment shown) per power system cycle. The digitized signal is then calibrated at 24 and filtered through a full cycle cosine filter 26.

The resulting signal is then applied, in the embodiment shown, to a conventional protective relay algorithm circuit 28 to provide backup protection which is separate from and in addition to the protection based on comparisons of currents from local and remote sources which is provided by the remainder of FIG. 1. Such backup protection could be based on impedance calculations (distance protection), current magnitude calculations (overcurrent protection) or other types of protection which require signals from only one end of the protected line.

The output of the cosine filter 26 is applied back to frequency tracker 22 as is zero crossing detection information (ZCD) from the low pass filter 12 to control the sampling rate of the analog signal.

The elements discussed above, from low pass filter 12 through cosine filter 26, are all conventional and are part of a conventional protective relay application. The present invention is explained below as part of such an application. As indicated above, however, the data alignment system of the present invention can be used in other applications.

Referring still to FIG. 1, the output of calibration circuit 24 is applied to a first resample circuit 30 which, in the embodiment shown, operates at a frequency of 800 Hz, which is the framing rate for transmitting circuit 32. Circuit 32 transmits the local resampled data from first resample circuit 30 to the remote data source/relay. The analog data signal from the local source thus is sampled at a rate of 16 times the power system frequency (which is typically 60 Hz) by frequency tracker 22 and then sampled again at a first resampling frequency, which in the embodiment shown is 800 Hz. The first resampling frequency can vary, but should be equal to the transmitting framing rate, as indicated above.

Because the first resampling circuit 30 and the transmit circuit 32 are driven by the same frequency signal, exactly one set of sampled data is available for each transmitted frame. In the embodiment shown, transmit circuit 32 also compresses the local source data set to 8 bits. The receiver at the remote data source/relay will expand the received data from the local source from 8 bits to the original full number of bits of information present at the local source/relay, prior to comparison of the two data sets. The signal transmitted to the remote source/relay is, in the embodiment of FIG. 1, thus the digital signal from the A–D converter 20 which has been resampled at a first resample frequency.

The resampled signal from the first resample circuit 30, besides being applied to transmit circuit 32, is also applied within the local source circuitry to a delay circuit 40. Delay circuit 40 delays the signal from the first resample circuit 30 by a specified time amount; i.e. the one-way transmission delay time between the remote source and the local source. The delay amount is determined by a "ping-pong" circuit 36. Briefly, the one-way transmission delay time is estimated as being approximately half the round-trip delay time. To measure the round-trip delay time, the local data source tags each message as it goes out to the remote source with an indicator, and then determines how long it takes to receive a response from the remote source to that message at receive circuit 38. The response message contains a field which includes the amount of time elapsed at the remote source between reception of the message there and transmission back to the local source. The one-way transmission delay time is the amount of the round-trip delay minus the time that the remote source holds a message from the local source before responding, divided by two. Hence, ping-pong circuit 36 obtains information from the transmit circuit 32 and receive circuit 38 to determine the actual transmission delay. The amount of delay is then sent to the delay circuit 40, as shown by dotted line 41.

The output from the first resampling circuit 30 is delayed by the specified delay amount from ping pong circuit 36 and applied to a second resampling circuit 42. The second resampling circuit 42 is set to sample at a frequency equal to the local frequency tracking rate, i.e. the initial sampling frequency which, in this particular embodiment, is 960 Hz. The output of the second resampling circuit 42 is applied to a digital filter 44 which is used to remove harmonics and other noise produced by the resampling circuit or present in the original local source data set. The output of filter 44 is then provided to local data calculation (and comparison) circuit 46. The arrangement and purpose of the calculation circuit may, of course, vary depending upon the particular application. In the present case, it performs the comparison with the remote data and produces the control signal which is applied to a contact output which in turn operates to result in opening of the system circuit breaker when the comparison indicates a fault on the line.

Data from the remote data source is received at receiver 38 at the local source, as explained above. The data from receiver 38 is applied to another second resampling circuit 48, which is identical to second resampling circuit 42. Resampling circuit 48 could be combined with resampling circuit 42, if desired. The data applied to resampling circuit 48 is coincident in time with the local data applied to the second resampling circuit 42, due to delay circuit 40. Accordingly, the data applied, respectively, to second resampling circuits 42 and 48, from the local source of data and the remote source of data, are aligned in time.

Resampling circuit 48 resamples the data applied to it at the same frequency used by second resampling circuit 42, i.e. the frequency used to sample the local source analog data. Since the two data streams are sampled at the same frequency, there will be phase alignment between the two sampled signals. The data from second resampling circuit 48 is applied to a filter 50, which is identical to filter 44, and then applied to the calculation and comparison circuit 46, which as explained above, makes comparisons in a conventional fashion to provide protection for the power line.

Hence, the circuit of the present invention as shown in FIG. 1 provides a convenient and reliable way to align data from local and remote sources so as to permit accurate comparison results.

In a modification of FIG. 1, particularly where bandwidth is not a concern, the first resample circuit 30 could be eliminated, with the output of calibration circuit 24 being applied directly to transmit circuit 32 and delay circuit 40. Hence, reference to the output of delay circuit 40 means either a delay of the initially sampled local source signal (from calibration circuit 24) or a delay of a resampled local source signal (such as from resample circuit 30).

Also, in the specific circuit of FIG. 1, with a first resampler 30, since the signal which is applied to delay circuit 40 from first resample circuit 30 is a discrete time sampled signal, delay circuit 40 is actually also in effect a resampler, since delay of a sampled signal is accomplished by resampling, i.e. interpolation between the original samples. Delay circuit 40 could be and typically is integrated with resample circuit 42 (but not resampler 48).

Figure 2:
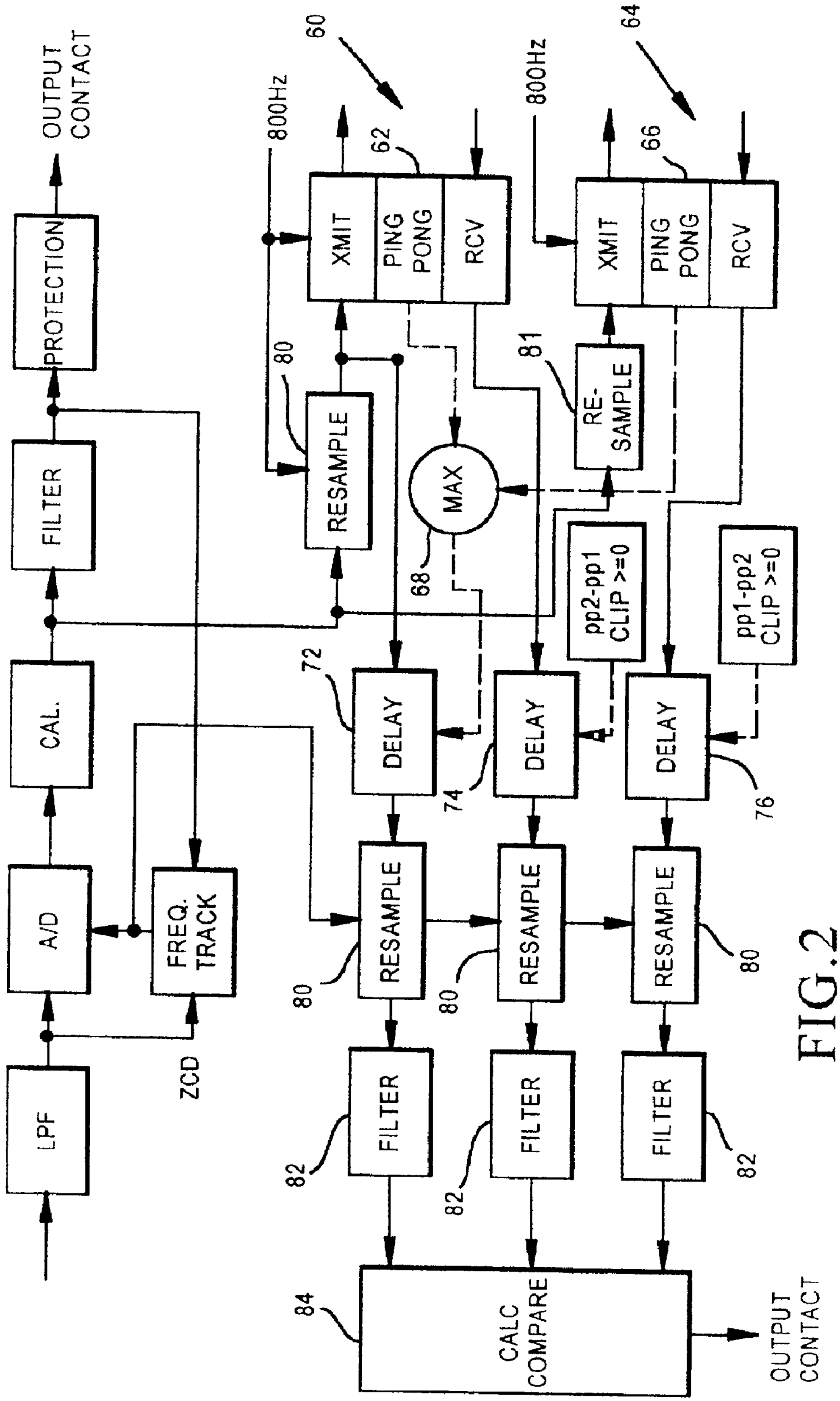
FIG. 2 is a block diagram showing a variation of the system of FIG. 1, with one local source of data and two remote sources of data.

FIG. 2 shows a variation of FIG. 1, involving a local source of data and two remote sources of data. In this case, there are two remote data transmit/receive channels at the local data source for receiving data from the remote sources. The first channel for the first remote source of data is referred to at 60. The first channel 60 includes a first delay value (pp1) determination from "ping-pong" 62 for the one-way transmission delay between the local source and the first remote source. The same is done for the second transmitter/receiver channel 64, with ping-pong circuit 66 determining a second delay value pp2.

The delay values (pp1 and pp2) are applied to a comparison circuit 68, which determines which of the two delay values is the largest. The local source data is delayed (delay circuit 72) by the larger of the two one-way transmission delays. The remote channel with the smaller one-way transmission delay has its data delayed by the difference in the two transmission delays, as shown in FIG. 2. The remote channel with the larger one-way transmission delay does not have its incoming data delayed. Delay circuits 74 and 76 are set accordingly. Circuit arrangements are provided at each of the three data source locations (the three individual terminals), with each location having one local data source and two remote sources.

Hence, the local source data directly from first resample circuit 80 experiences the longest delay, while the remote channel with the smaller of the two calculated transmission delays, either channel 60 or 64, is delayed by the difference between the larger and the smaller of the two remote transmission delay times. The local source data is taken arbitrarily (it is a matter of choice) from the resampler associated with the first channel 60. It could also be taken from the resampler 81 associated with the second channel 64.

The result of the delay arrangement of FIG. 2 is that the data from the local source and the two remote sources are all aligned in time at the local source. The data sets from delay circuits 72, 74, 76 are then sent to identical second resample circuits 80-80, which resample each signal at the original sampling frequency. The output of the second resampling circuits 80-80 are applied to identical filters 82-82, and from there to calculation and comparison circuit 84. Again, the calculation/compare circuit 84 is not part of the present invention. The output of circuit 84 is applied to output contacts which control the circuit breaker for the power line.

In the three source implementation of FIG. 2, it is uncertain as to whether or not the average transmit frame rates (800 Hz in FIG. 2) are identical. In fact, there is no such requirement. For example, if channel 60 is a 64 k baud channel and channel 64 is a 56 k baud channel, the transmit frame rate for channel 60 will be 800 Hz and the transmit frame rate for channel 64 will be 700 Hz. The present method/apparatus of data alignment works equally well with matched or mismatched transmit frame rates.

Again with respect to the three source implementation of FIG. 2, the resampling circuits 80 and 81 could be eliminated as discussed above with respect to FIG. 1.

When an error occurs during data transmission in the system of either FIG. 1 or 2, the receiving relay cannot use the message content. Since it is important to continue to transmit valid information so that the remote data source/relay can continue to accurately perform its own protection requirements, no response is generated to a corrupt message; the local relay simply responds to the previous uncorrupted message. The number of transmissions between valid receptions thus increases. The local relay must in that case tolerate the possibility of its transmission of two messages between receptions of valid messages at times, and the remote relay must be tolerant of reception of two responses to some transmitted messages.

With respect to analog data which may be lost in the transmission process, the local relay may be designed to interpolate the actually received data to, in effect, recapture the lost data. The digital filter then removes certain undesired effects produced by the interpolation. However, if too much data is lost to permit successful data replacement by interpolation, the data alignment system is suspended and further processing (comparison) using aligned data is not possible until communication is restored and the output of the filters have stabilized.

Hence, a new system of aligning data between a local and a remote source or source has been disclosed. The system takes into account and corrects for both the transmission delay time between the local and remote data sources and the differences in the initial phase/frequency sampling of the data.

Although a preferred embodiment of the invention has been disclosed here for purposes of illustration, it should be understood that various changes, modifications and substitutions may be incorporated without departing from the spirit of the invention, which is defined by the claims which follow. For example, while the embodiments described here delay local initially resampled data and then again resample that resulting data, it is possible, as indicated briefly above, to simply delay the local data which has been initially sampled and then resample that data. Initially resampled local source data is used in case the resampling process introduces significant distortion in attempting to match the distortion introduced by the local and remote first resamples.

What is claimed is:

1. A system for aligning and synchronizing data between a local and a remote source of data, comprising:

a first sampling system for initially sampling local source data at an original sampling rate;

a receiver at a local source of data for receiving sampled data from a remote source of data;

a transmitter for transmitting sampled local source data to the remote source;

a delay element for delaying the sampled local source data by an amount of time approximately equal to the data transmission delay time between the local and remote sources; and a resampling system for resampling the delayed local source data and the received data from the remote source at a selected resampling rate, wherein the resulting output of the resampling system is such that the remote data is aligned with the local data at the local source.

2. A system of claim 1, wherein data received from the remote source is initially sampled at said original sampling rate and then is resampled prior to transmission to the local source and wherein the system includes another resampling system for resampling the initially sampled local source data prior to delay thereof.

3. A system of claim 2, wherein said another resampling system has a resampling rate equal to the frame rate for transmitting data from the local source to the remote source, which ensures that no more than one set of data is transmitted to the remote relay at a time.

4. A system of claim 1, wherein said resampling system for the local and remote source data has a sampling rate equal to the original sampling rate.

5. A system of claim 1, including a filter for removing noise from the resampled local and remote source data.

6. A system of claim 1, wherein the resampled local and remote data is usable for differential current analysis in a power line protection system.

7. A system of claim 1, wherein the delay time is determined by determining the round trip data transmission time between the local and remote sources, subtracting the amount of time between receipt of local source data by the remote source and transmission back to the local source and then dividing the result by two.

8. A system of claim 2, including two remote data sources, wherein the local source data from said another resampling system is delayed by the maximum of the two one-way transmission times from the remote sources to the local source, wherein the data from the remote source having the smaller of the two one-way transmission times is delayed by the amount of one-way transmission time difference between the two one-way transmission times, and wherein the delayed local source data, the delayed remote source data and the undelayed remote source data are all resampled by the resampling system.

9. A system for aligning and synchronizing data between a local and a remote source of data, comprising:

a first sampling system for initially sampling local source data at an original sampling rate;

a receiver at the local source for receiving data from a remote source, the data received from the remote source having been initially sampled at the original sampling rate and then resampled at a first resampling rate at the remote source prior to transmission to the local source;

a first resampling system for resampling the initially sampled local source data at said first resampling rate;

a transmitter for transmitting the resampled local source data to the remote source;

a delay element for delaying the resampled data from the local source by an amount of time approximately equal to the data transmission delay time between the local and remote sources; and a second resampling system for resampling the delayed local source data and the received data from the remote source at a second resampling rate, wherein the resulting output of the second resampling system is such that the remote data is aligned with the local data at the local source.

10. A system of claim 9, wherein the first resampling rate is equal to the frame rate for transmitting data from the local source to the remote source, which ensures that no more than one set of sampled data is transmitted to the remote relay at a time.

11. A system of claim 9, wherein the second resampling rate is equal to the original sampling rate.

12. A method for aligning and synchronizing data between a local and a remote source of data, comprising the steps of:

initially sampling local source data at an original sampling rate;

receiving sampled data from a remote source of data;

transmitting sampled local source data to the remote source;

delaying the sampled local source data by an amount of time approximately equal to the data transmission delay time between the local and remote sources; and resampling the delayed local source data and the received data from the remote source at a selected resampling rate, wherein the resulting output of a resampling system is such that the remote data is aligned with the local data at the local source.

13. A method of claim 12, wherein data received from the remote source is initially sampled at said original sampling rate and then is resampled prior to transmission to the local source and wherein the method includes the additional step of resampling the initially sampled local source data prior to delay thereof.

14. A method of claim 12, wherein the additional step of resampling has a rate equal to the frame rate for transmitting data from the local source to the remote source, which ensures that no more than one set of data is transmitted to the remote relay at a time.

15. A method of claim 12, wherein the resampling of the local and remote source data has a sampling rate equal to the original sampling rate.

16. A method of claim 12, including a filter for removing noise from the resampled local and remote source data.

17. A method of claim 12, wherein the resampled local and remote data is usable for differential current analysis in a power line protection system.

18. A method of claim 12, wherein the delay time is determined by determining the round trip data transmission time between the local and remote sources, subtracting the amount of time between receipt of local source data by the remote source and transmission back to the local source and then dividing the result by two.

19. A method of claim 13, for use with two remote data sources, wherein the local source data from said another resampling system is delayed by the maximum of the two one-way transmission times from the remote sources to the local source, wherein the data from the remote source having the smaller of the two one-way transmission times is delayed by the amount of one-way transmission time difference between the two one-way transmission times, and wherein the delayed local source data, the delayed remote source data and the undelayed remote source data are all resampled by the resampling system.

* * * * *